United States Patent [19]

Soe

[11] 4,301,878
[45] Nov. 24, 1981

[54] COMPUTING SCALE WITH LABEL ISSUING SCHEME

[75] Inventor: Masao Soe, Osaka, Japan

[73] Assignee: Kubota, Ltd., Osaka, Japan

[21] Appl. No.: 102,455

[22] Filed: Dec. 11, 1979

[30] Foreign Application Priority Data

Mar. 27, 1979 [JP] Japan .............................. 54-40481[U]
Mar. 27, 1979 [JP] Japan .............................. 54-40482[U]
May 14, 1979 [JP] Japan .............................. 54-64352[U]

[51] Int. Cl.³ ...................... G01G 23/38; B65H 23/04; B65H 17/02
[52] U.S. Cl. .......................................... 177/5; 177/8; 226/196; 242/68.2; 242/68.3; 242/76
[58] Field of Search ..................................... 177/2–13; 156/384, 568; 226/196, 197; 242/68, 68.1, 68.2, 68.3, 76, 68.5

[56] References Cited

U.S. PATENT DOCUMENTS

| | | | |
|---|---|---|---|
| 2,095,733 | 10/1937 | Coryell | 226/196 X |
| 3,104,806 | 9/1963 | Allen | 177/3 X |
| 3,393,849 | 7/1968 | Hass | 226/196 X |
| 3,461,984 | 8/1969 | Phillips et al. | 177/3 |
| 3,837,690 | 9/1974 | Fraser, Jr. et al. | 242/68.5 X |
| 4,035,808 | 7/1977 | Karp | 156/384 X |
| 4,084,683 | 4/1978 | Moss | 226/196 X |
| 4,101,366 | 7/1978 | Teraoka et al. | 177/3 X |
| 4,120,245 | 10/1978 | Karp et al. | 156/384 X |

*Primary Examiner*—George H. Miller, Jr.
*Attorney, Agent, or Firm*—W. G. Fasse; D. F. Gould

[57] ABSTRACT

A computing scale with a label issuing system comprises an electronic weighing portion employing a load cell of a strain gage type and a label issuing portion. The label issuing portion comprises a printer for printing a weight value, price and the like on labels. The printer is spaced apart from a base or chassis by a very small gap. A rolled-up sheet supporting portion for supporting a label retaining backing sheet rolled-up and a winding portion for winding up the backing sheet from which labels have been stripped are provided rearward of the printer. The labels are subjected to printing of the weight and the like by the printer based on the data obtained from the weighing portion and stamping of the item by means of a stamping portion and are then substantially stripped, with a minor portion thereof retained to the backing sheet, by means of a stripping portion provided forward of the printer, whereupon each of the labels is manually removed from the backing sheet. The printer of the label issuing portion, the rolled-up sheet supporting portion and the sheet winding portion are disposed so that the height of the apparatus may be minimal.

39 Claims, 20 Drawing Figures

COMPUTING SCALE WITH LABEL ISSUING SCHEME

BACKGROUND OF THE INVENTION

1. Field of the Invention

The present invention relates to a computing scale with a label issuing system. More specifically, the present invention relates to a computing scale with a label issuing system for printing prescribed information such as a measured weight on labels retained on a backing sheet and for substantially stripping a major portion of each of the labels from the backing sheet by means of a stripping plate, so that an operator can completely strip the substantially stripped label and stick the same to a predetermined portion of a commodity.

2. Description of the Prior Art

Such a computing scale with a semiautomatic label issuing system as described in the foregoing has conventionally employed a so-called spring scale for the weighing operation. Accordingly, such a weighing system per se has been relatively bulky. On the other hand, the label issuing system is also provided with a printer for printing prescribed information such as a weight, price, unit price, a processing date, and the like, under which printer a backing sheet winding portion is provided for winding a backing sheet from which labels have been stripped. Furthermore, a rolled-up sheet supporting portion for maintaining a label retaining rolled-up backing strip is provided rearward of the printer. Accordingly a conventional computing scale with a label issuing system has been bulky and thus of relatively large size.

On the other hand, users of such scales prefer a compact computing scale with a label issuing scheme that can be placed even on a small showcase. Generally a showcase is shaped to be of some height with a small area of the upper surface, covered with a glass plate of relatively small strength for the purpose of facilitating observation of the commodities housed therein. Accordingly, in order to use such a computing scale with a label issuing scheme by placing the same on a showcase, it is required that a computing scale be compact such that the height of the scale is small and so as to facilitate observation of an indication by the scale. The surface area taken up by the scale must also be small.

Recently, a weighing apparatus employing an electronic transducer such as a load cell or strain gage type has been proposed and used in practice instead of a conventional spring scale. Employment of such a load cell makes it possible to make the scale compact. However, so far the whole apparatus is not yet compact. In other words, the whole aparatus of such a computing scale cannot be made compact, unless both the scale proper and label issuing systems are reduced in size. In addition, it is desired or required that such computing scale is structured to comprise a label withdrawing portion for withdrawing a substantially stripped label, which label withdrawing portion is disposed at a sufficiently lower level. because such a scale is placed on the top surface of a relatively high showcase. It is further desired or required that a control panel such as a keyboard and a data display portion for observation by a customer are also disposed at a lower level of such computing scale. Furthermore, the low height of the apparatus is desired so as not to interfere with the conversation with customers.

Although separate implementation of a label issuing scheme and a weighing and display scheme has been proposed and put in practical use, such implementation cannot make the apparatus fully compact in the light of the above described problems.

SUMMARY OF THE INVENTION

Briefly described, the present invention comprises an improvement in a layout of a label issuing system in a computing scale including a weighing portion and a label issuing portion, whereby the whole apparatus is made compact. The label issuing system comprises a printer, which is spaced apart from a base or chassis by a very small gap. A rolled-up sheet supporting portion and a backing sheet winding portion are provided rearward of the printer. The rolled-up sheet supporting portion is disposed substantially above the backing sheet winding portion and a label retaining backing sheet is drawn from the rolled-up sheet supporting portion through a printer portion, and the backing sheet from which labels have been stripped is again drawn to the backing sheet winding portion, located rearward of the printer portion. Such structure or layout of the apparatus makes the whole apparatus compact.

A label stripping portion is located forward of the printer portion and a stamping portion for stamping an information item on the label on which the information such as the weight has been printed is provided in the label stripping portion. The label on which the information item is stamped by the stamping portion is brought to a substantially stripped condition by means of the label stripping portion whereby the label is still partially retained on the backing sheet. The label thus substantially stripped is manually completely stripped by an operator and is stuck to merchandise. In a preferred embodiment of the present invention, the item stamping portion is also compact. More specifically, the item stamping portion comprises a solenoid beneath a stripping plate for substantially stripping labels or a separate stamping table, and a plunger operable by the solenoid for protruding above the label stripping plate or the stamping table. A bar is fixed to the upper end of the plunger for fixing the stamping plate in the horizontal direction, so that the stamping plate is replaceably fixed to the bar. Accordingly, the stamping plate is urged toward the label stripping plate or the stamping table through downward depression of the plunger by the solenoid, whereby the information on the stamping plate is stamped on the label positioned on the label stripping plate or the stamping table. A rod and/or a weight is suspended at the other end of the stamping plate supporting bar as a counter weight for balancing the weight of the stamping plate. Thus, since the components are located below the stamping table according to the present invention, the height of the stamping portion can be decreased and thus the entire apparatus can be made compact.

The backing sheet fed from the rolled-up sheet supporting portion through the printer portion and stamping portion to the backing sheet winding portion is guided by means of a guide roller located forward of and beneath the printer portion, i.e. below the stamping portion. In a preferred embodiment of the present invention, the guide roller is slightly tapered at both end portions like a barrel shape whereby the central portion has a larger diameter than both end portions. Accordingly, the backing sheet as guided by means of the guide roller, can be stably fed toward the backing sheet winding portion. Furthermore, since a parallel relationship between the backing sheet and the guide roller can be adjusted, a parallel relation of various components along a feeding path of the backing sheet with respect to the roller shaft is not strictly required.

In a further preferred embodiment of the present invention, the backing sheet winding portion comprises a winding drum and a U-shaped member fitted into grooves formed in the axial direction on the peripheral side surface of the drum, so that removing the U-shaped member from the grooves facilitates the removing of the backing sheet from the drum. Preferably, the width of the drum is slightly shorter than the width of the label in order to make it possible to fully grasp the end of the backing sheet wound on the drum for removing the backing sheet from the drum. Therefore, the backing sheet can be removed in the form as wound, without loosening the backing sheet.

In a further preferred embodiment of the present invention, a guide plate is provided between the rolled-up sheet supporting portion and the printer for guiding the label retaining backing sheet from the rolled-up sheet supporting portion to the printer. The guide plate is rotatably mounted with the end thereof at the side of the printer acting as a fulcrum. A guide member, arcuate in section, is provided above the guide plate, so that the cooperation between the guide plate and guide member exerts a predetermined tension on the backing sheet being wound by the winding portion and thus also on the label retaining backing sheet as it is being fed. Furthermore, a locking means are provided for locking the guide plate in a state as separated from the guide member, so that an operation such as the replacement of the label retaining backing sheet is facilitated.

In a further preferred embodiment of the present invention, the winding drum is dirven by a motor. To that end, a photosensitive device is located in a given position on the feeding path of the backing sheet, so that the photosensitive device can detect the interval between any adjacent two labels retained on the backing sheet. A timer is provided for setting a predetermined time period required for feeding at least one label retained on the backing sheet through a given distance. The motor is controlled to stop in response to the output of the photosensitive device or the output of the timer, whichever operates first. The preferred embodiment of the present invention makes sure that even if one label is missing midway on the label retaining backing sheet the motor is stopped upon detection of the following label. In this embodiment the motor is also stopped in responsive to the output of the timer even if the label retaining backing sheet does not carry any further labels, which eliminates continued energization of the motor, thereby to prevent overheating of the motor.

OBJECTS OF THE INVENTION

Therefore, a principal object of the present invention is to provide an improved computing scale with a label issuing system.

Another object of the present invention is to provide a more compact computing scale with a label issuing system.

A further object of the present invention is to provide a computing scale with a label issuing system, wherein a rolled-up sheet supporting portion and a backing sheet winding portion are uniquely disposed, whereby the apparatus as a whole may be made compact.

Still a further object of the present invention is to provide a computing scale with a label issuing system having an improved item stamping portion.

It is another object of the present invention to provide a computing scale with a label issuing system wherein means for exerting tension for feeding a label retaining backing sheet and means for guiding the backing sheet are implemented using a common element, whereby the structure of the apparatus is simplified.

It is a further object of the present invention to provide a computing scale with a label issuing system having an improved backing sheet winding portion.

It is still a further object of the present invention to provide a computing scale with a label issuing system, wherein the configuration of a guide roller for guiding a backing sheet to a backing sheet winding station is improved for enabling a stabilized feeding operation.

It is still a further object of the present invention to provide a computing scale with a label issuing system, wherein a label retaining backing sheet is positively and intermittently fed and a driving means is deenergized in response to the absence of the labels.

These objects and other objects, features, aspects and advantages of the present invention will become more apparent from the following detailed description when taken in conjunction with the accompanying drawings.

DESCRIPTION OF THE PREFERRED EMBODIMENTS AND OF THE BEST MODE OF THE INVENTION

Figure 1:
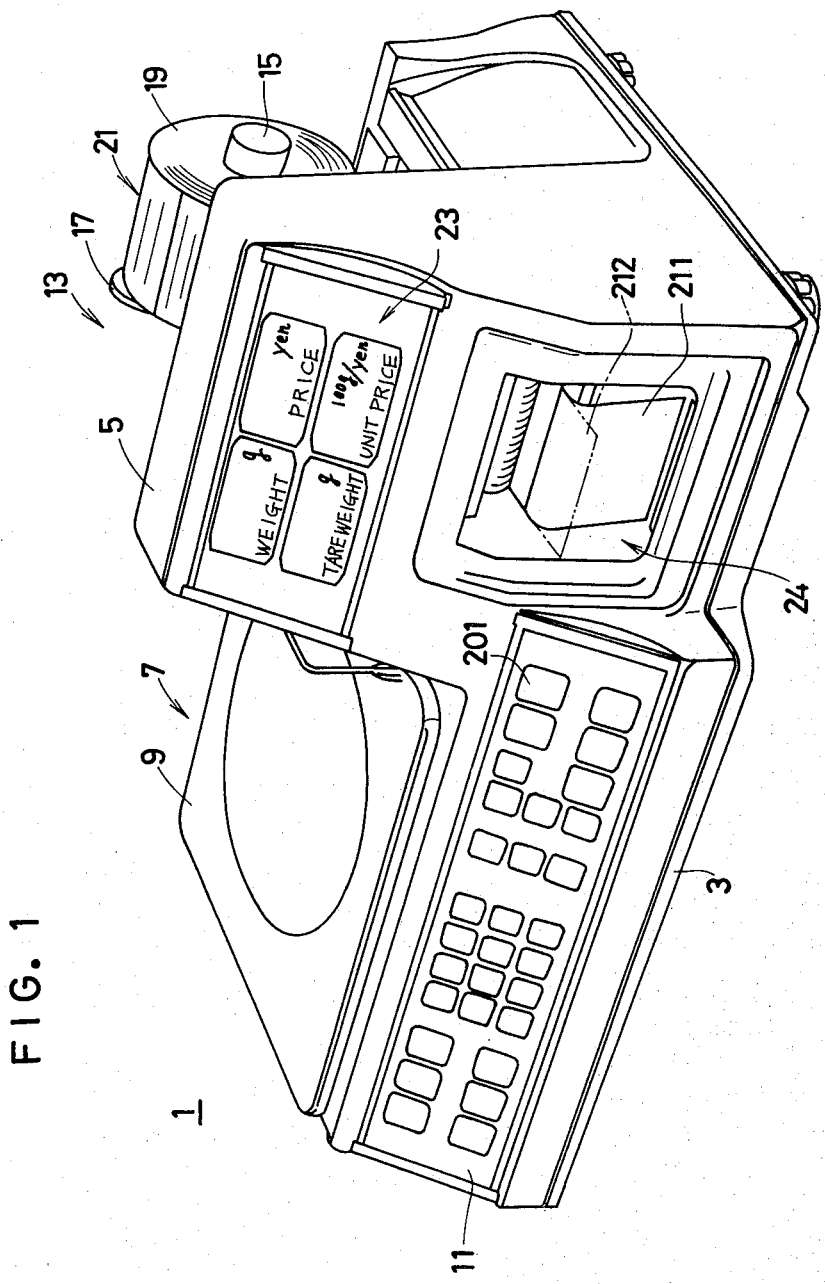
FIG. 1 is a front perspective view of one embodiment of the present invention.

FIG. 1 is a perspective view of one embodiment of the present invention. Referring to FIG. 1, an outline of the present computing scale 1 with a label issuing system 13 will be described. The computing scale 1 comprises a weighing portion 7 and a label issuing system 13. Major components of the weighing portion 7 and the label issuing portion 13 are housed within the space defined by a base or a lower base 3 and an upper housing 5. As seen in FIG. 1, the upper case 5 is shaped to have a relatively low portion for accommodating the weighing portion 7 and a relatively high portion for accommodating the label issuing system 13. The weighing portion 7 comprises an article placing pan 9, which is mechanically and operatively coupled to a weighing means, not shown, housed within the upper housing 5. The weighing means, not shown, may comprise a means for generating weight data and the like by processing an analog voltage obtained from a load cell of a strain gage type, for example. A keyboard 11 is provided on the upper housing 5, which keyboard comprises numeral keys for entering a numerical value and function keys for setting various functions.

Figure 13:
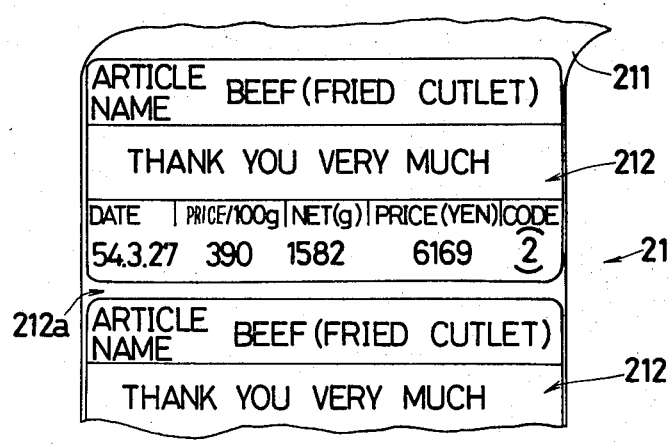
FIG. 13 is a diagrammatic view showing labels retained on a backing sheet for use in the present invention.

Although not shown in FIG. 1, the label issuing system 13 comprises a printer housed in the upper housing 5. A roll sheet supporting portion comprising a frame 17, a suppressing plate 19 and a fixing member 15 is located outside of the upper housing 5 in the rear of the printer. The backing sheet supporting portion is used to maintain a rolled-up sheet 21 of a label retaining backing sheet as shown in FIG. 13, for example. The label retaining backing sheet 21 is unwound and fed through a printer portion, not shown, inside of the upper housing 5 to the front of the printer portion and further through beneath the printer portion to be wound up again in a backing sheet winding portion, not shown, but disposed in the upper housing 5 and beneath the rolled-up sheet supporting portion. The upper housing 5 also encloses a label withdrawing portion 24, so that a label 212 may be substantially stripped, with a portion thereof still retained on the backing sheet, as shown by the dash-dotted line in FIG. 1. An operator then manually strips the label 212 completely from the backing sheet 211 and then sticks the label on a prescribed area of a commodity. The labels 212 are detachably retained on the backing sheet 211, as shown in FIG. 13. The labels 212 are disposed on the backing sheet 211 with a given spacing therebetween, so that the same can be detected by a photodetector 35, to be described below with reference to FIG. 2. As better seen in FIG. 1, the present computing scale 1 is very compact. In one actual embodiment of the present invention, the casing of the label issuing portion is about 245 mm high, while the article placing pan 9 is about 130 mm high, about 480 mm in width and about 330 mm in length. The above described example of specific dimensions substantiates the optimal compactness of the inventive apparatus as compared with a conventional scale of this type.

As viewed in FIG. 1 the front side faces the sales clerk and the rear faces the customer. Although not shown, a customer display is usually provided at the customer side of the apparatus for displaying a weight, the unit price, price and the like. The customer display, not shown, is structured to display the same information as that displayed by the shop display 23 provided on the upper housing 5.

The roll sheet supporting portion supports a roll of the backing sheet 211 on which a multiplicity of labels 212 are arranged and temporarily retained, so that the backing sheet may be unwound in the direction toward the printer portion, not shown in FIG. 1.

Referring to FIG. 13, labels 212 are shown already printed with data. The data include article name "Beef (for fried cutlet)", process date "54 (1979), 3 (March), 27", price per unit weight (Yen) "390", net weight (g) "1582", article price (Yen) "6169", and code number "2". Such painting is effected in the label issuing system 13 and for this purpose the label issuing system 13 includes a printer. The labels 212 have a viscous adhesive applied to one of their surfaces and are temporarily retained on the backing sheet 211 under the action of said viscous adhesive. That surface of the backing sheet 211 which is in contact with the labels 212 has been subjected to a known preferable surface treating process, so that the labels 212, though sufficiently adhering to the backing sheet 211 may be easily stripped therefrom. The label 212 is stripped from the backing sheet 211 and is stuck to a commodity. For this purpose, the label issuing system 13 includes a label stripping means.

Figure 2:
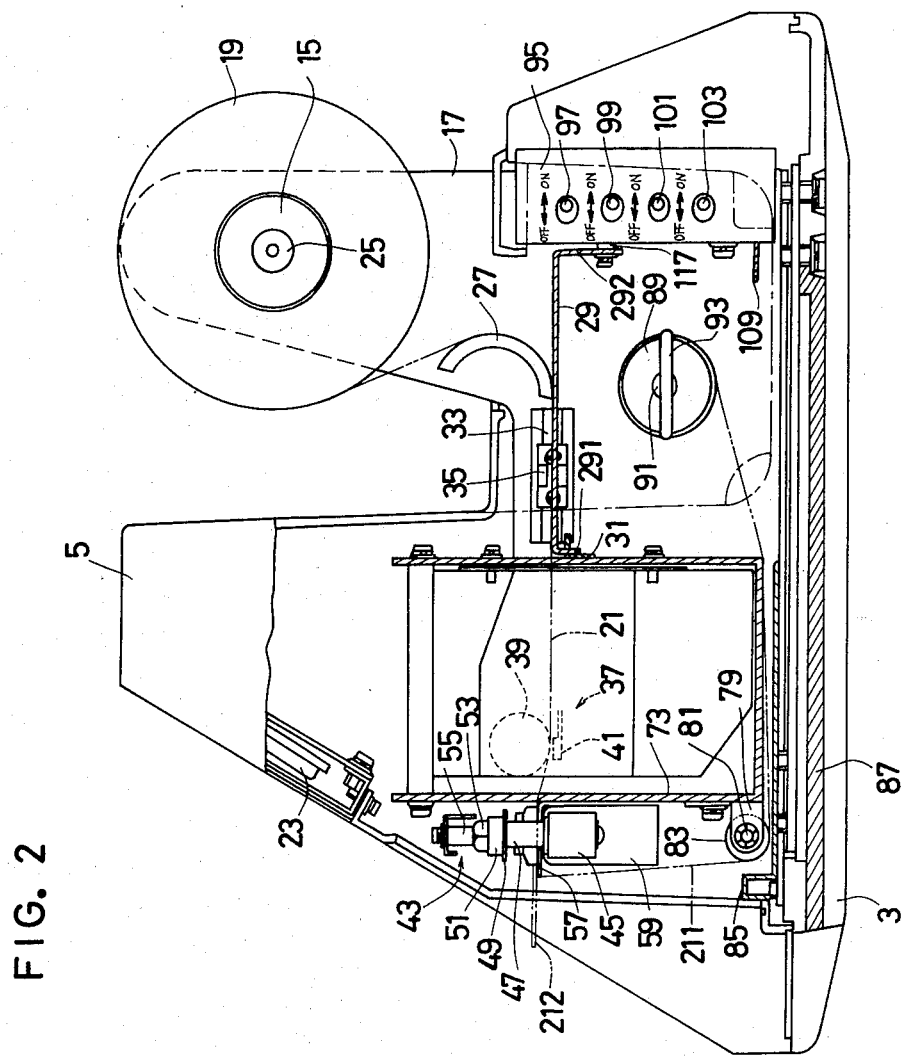
FIG. 2 is a sectional view of the FIG. 1 embodiment, as viewed from the right side in FIG. 1.

FIG. 2 is a sectional view showing the internal structure, as viewed from the right in FIG. 1. A chassis 87 is provided on the lower base 3. All the components are mounted on the chassis 87. A printer 37 is supported in a printer frame 73. The printer 37 comprises a printer drum 39 and a printer hammer 41, as shown by a dotted line in FIG. 2, so that the information such as a weight, a unit price, price and a processing date is printed on labels retained on a backing sheet as it is fed to that position.

Figure 3:
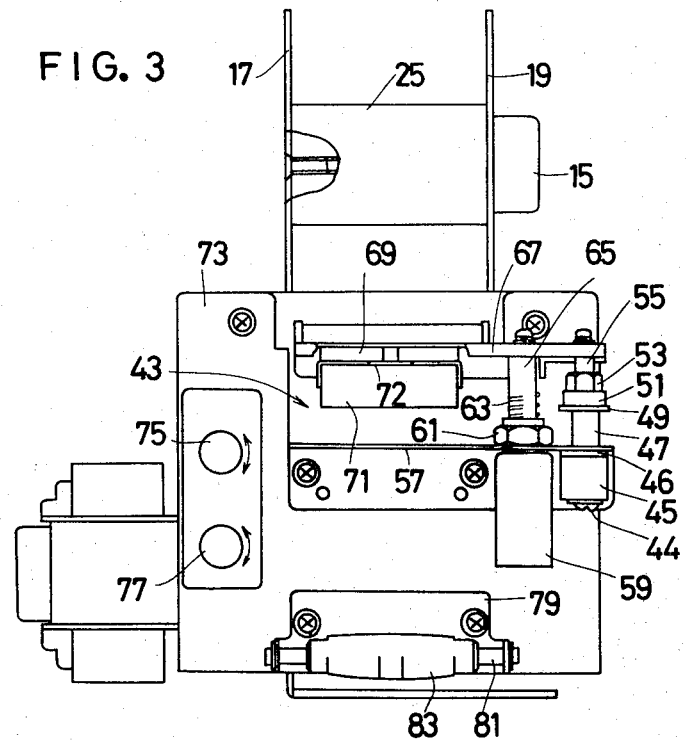
FIG. 3 is a view showing in detail a stamping portion of the embodiment of the present invention.

A rolled-up sheet supporting portion and a backing sheet winding portion are provided in the rear of the printer 37 and thus of the printer frame 73 (the right side in FIG. 2). As described above, the rolled-up sheet supporting portion comprises the frame 17, the suppressing plate 19 and the fixing member 15 and further comprises a winding core 25 (FIG. 3). The label retaining backing sheet 21, as rolled up, is fitted into the core 25 and is sandwiched between the pressing plate 19 and the frame 17, so that the same is kept in a up shape. The label retaining backing sheet 21 is unwound from the core 25 as shown by the dash dotted line and guided through between a guide member 27 and a guide plate 29 to the printer 37 and is further guided by a guide roller 83 through an information stamping portion 43 to the backing sheet winding portion. The backing sheet winding portion comprises a winding drum 89, a rotating shaft 91 and a U shaped member 93. The backing sheet winding portion will be described in more detail below.

A selection switch group 95 is provided in the upper housing 5. The selection switch group 95 comprises switches 97, 99, 101 and 103 for selectively setting the data being printed or stamped by means of the printer 37 and an information stamping portion 43. The switch 97 is used to selectively set whether an item is to be stamped on labels by means of the stamping portion 43, the switch 99 is used to selectively set whether a date or a processing date is to be printed by means of the printer 37, the switch 101 is used to selectively set whether a unit price is to be printed, and the switch 103 is used to selectively set whether a weight is to be printed. Accordingly, the switches 97, 99, 101 and 103 of the switch group 95 are electrically connected to the printer 37 and/or the stamping portion 43, although not shown. For example, if the switch 97 is turned off, the item is not stamped by means of the stamping portion 43, and for example, if the switch 99 is turned off, a processing date is not printed by means of the printer 37, and so on.

As seen from FIG. 2, the gap between the printer frame 73 and the chassis 87 is very narrow but wide enough for the passage of the backing sheet 211 from which the labels have been stripped. As a result, the printer portion can be fixed in a very low location of the apparatus. In addition, locating the rolled-up sheet supporting portion, including the components 15, 17, 19 and 25 and the backing sheet winding portion, including the components 89, 91 and 93 in the rear of the printer portion makes it possible to minimize the height of the apparatus. The label retaining backing sheet 21 and thus the backing shet 211 is fed from the rolled-up sheet supporting portion to the backing sheet winding portion, as shown in FIG. 2; however, a reduction gear combined with a motor 125 as shown in FIG. 5 is used as a prime mover for such feeding operation whereby the winding drum 89 is rotated by the motor 125 for the successive feed advance of the sheeet 21, 211 which is maintained under tension by the cooperation of the guide member 27, arcuate in section, and the guide plate 29. More specifically, the guide plate 29 functions not only as a guide for the label retaining backing sheet 21 and thus 211 but also as a tension plate for exerting a tension on the backing sheet 21 and thus 211. The tension and guide plate 29 is structured as adjustably turnable upward and downward as desired (FIG. 4) for a given range by means of an L-shaped plate 31 fixed to the side wall of the printer frame 73, with the end portion 291 of the L-shaped side as the center. In a normal label issuing operation, the tension plate 29 is placed in pressure contact with the guide member 28 with a predetermined pressure. Accordingly, the label retaining backing sheet 21 being fed through the guide member 27 and the tension plate 29, is sandwiched with the above described pressure, so that when the winding drum 89 is rotated by means of the motor 125 (FIG. 5) a tension is exerted to the backing sheet 21, 211. The tension plate 27 will be described in more detail with reference to FIGS. 4, 5 and 6.

Now referring to FIGS. 2 and 3, the structure of the item stamping portion 43 comprises a stripping plate 57 for stripping labels 212 from the backing sheet 21, thereby to leave the backing sheet 211. The stripping plate 57 serves to substantially strip each of the labels 212 from the backing sheet 211, with a portion of the label 212 still retained on the backing sheet 211, by guiding the backing sheet 211 vertically downward of the stripping plate 57 by means of the guide roller 83 and by strongly pulling the backing sheet 211 from the end of the stripping plate 57. A solenoid 59 is fixed to the stripping plate 57 by means of a nut 61, so that the solenoid 59 is located beneath the same. The solenoid 59 serves to attract or release the plunger 65. The plunger 65 extends above the stripping plate 57 through an aperture, not shown, in the stripping plate 57. A bar 67 is fixed in the horizontal direction at the upper end of the plunger for fixing the stamping plate 71. A spring 63 is provided outside of the plunger 65, so that the spring 63 urges upwardly the bar 67 and thus the stamping plate 71 through the spring force when the plunger 65 is released by the solenoid 59. When the stamping plate 71 is urged upward it is in a stamp standby state. A magnet 69 is fixed to one end of the bar 67, so that the magnet 69 further attracts the stamping plate 71. A knob 72 protruding forward (FIGS. 4 and 5) is formed at the upper end of the stamping plate 71. The knob 72 is used to pick up the stamping plate 71 when the stamping plate 71 is replaced by another stamping plate.

The upper end of the rod 47 is fixed to the other end of the bar 67 by means of a screw, so that the rod 47 is suspended from the other end of the bar 67. The rod 47 extends through an aperture, not shown, in the stripping plate 57 to the lower side of the stripping plate 57. A weight 45 of predetermined size is fixed by means of a screw 44 to the lower end of the rod 47. The weight 45 functions as a counter balance for balancing the bar 47. A rubber plate 46 is provided at the upper end of the weight 45 to serve as a bumper or cushion. A stopper nut 51 is fixed by means of a nut 53 to a given location along the rod 47 (corresponding to a displacing distance of the plunger 65) above the stripping plate 57. Accordingly, the upper portion of the rod 47 is a threaded portion 55. A rubber plate 49 is fixed to the lower end of the stopper nut 51 to serve as a bumper or cushion. By turning the nut 53, a distance between the rubber plate 49 and the stripping plate 57 can be adjusted, whereby the force of urging the stamping plate 71 to the label (FIG. 2) can be adjusted. The weight value of the weight 45 is selected such that the weight of the stamping plate 71, the magnet 69 and the like and the weight of the rod 47, the nuts 51 and 53 and the weight 45 are substantially balanced, whereby the length of the plunger 65 acts as a fulcrum. Accordingly, if the weight of the rod 47 is relatively large, then the weight 45 may not be necessary.

In stamping an information item on the label with such a structure, the solenoid 59 is energized, so that the plunger 65 is attracted downwardly against the urging force of the spring 63. Then the bar 67 as coupled to the end of the plunger 65 is displaced downwardly with the result that the stamping plate 71 is pressed against the label on the stripping plate 57 with a given pressure. Accordingly, characters of prescribed letters, symbols and the like are stamped on the label. In this case, the load exerted on the plunger 65 is balanced at the left and right and, since the rod 47 extends through an aperture, in the stripping plate 57 serving as a guide, the plunger 65 can be displaced smoothly in the upward and downward direction.

Although, in the above described embodiment the stripping plate 57 was used as a stamping backing for the stamping plate 71, alternatively a separate stamping table, not shown, may be provided independently of the stripping plate 57.

By structuring the stamping portion 43 in the above described manner, the solenoid 59 is disposed beneath the stamping table, i.e. the stripping plate 57, which makes it possible to implement the stamping portion with extreme compactness. Furthermore, since a load for balancing is provided at the other end of the bar for fixing the stamping plate 71, the torque moment of the bar 67 with the location of the plunger 65 as a fulcrum is balanced, which enables a very smooth displacement of the plunger 65, with the result that any non-uniformity of a stamping operation is avoided.

As best seen in FIG. 2, the embodiment shown comprises a protective cover 85 provided beneath the guide roller 83. The cover 85 may be fixed to the head of a bolt for stopping the lower base 3. Accordingly, the cover 85 is detachable and hence replaceable. The cover 85 is provided for the following reasons. If and when the backing sheet is fed, with the labels substantially stripped by means of the stripping plate 57, and not yet fully stripped by an operator, in the direction of the guide roller 83, the labels as substantially stripped and partially retained on the backing strip could adhere to the chassis or base particularly beneath the printer frame 73. Since the bottom end of the printer frame 73 and the chassis or base are spaced apart from each other by a very small gap, adhering of the labels to the chassis or the base could cause jamming of the labels. Accordingly, it is necessary to remove such labels. If the protective cover 85 is provided in the above described manner, such undesired labels may stick to the cover 85 rather than to the chassis. Accordingly, by removing the cover 85 any such undesired labels can be simply removed and thus the cause of jamming can be simply eliminated.

Figure 5:
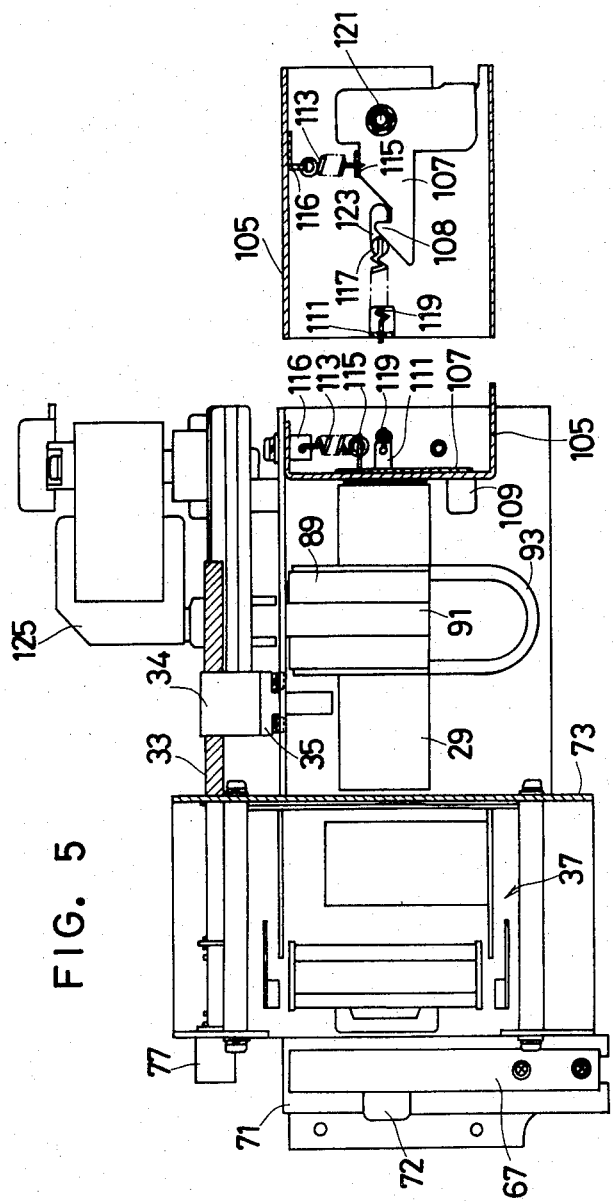
FIG. 5 is a top view of the embodiment of the present invention, as viewed from the top in FIG. 4.
Figure 6:
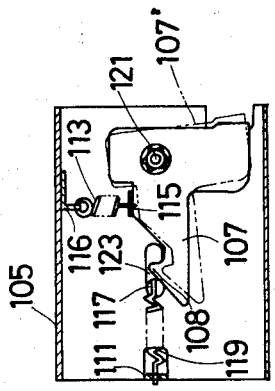
FIG. 6 is a diagrammatic view showing a displaced state of a lock lever.

Now referring to FIGS. 4, 5 and 6, the guide plate 29 and various components associated therewith will be described. As seen from FIG. 4, both ends 291 and 292 of the guide plate 29 have been bent at approximately a right angle. One end portion 291 is supported by a L-shaped plate 31 fixed to the printer frame 73 and as a result the guide plate 29 is turnable upwardly and downwardly to the location 29' as shown by the dash dotted line in FIG. 4.

On the other hand, as seen from the right side view in FIG. 5, the frame 105 is formed of an elongated aperture 123, so that an engaging pin 117 may be engaged. One of the spring 119 is coupled to the tip end of the engaging pin 117 on the outside of the frame 105. The spring 119 is coupled at the other end to the engaging portion 111 fixed to the frame 105. The lock lever 107 is rotatably mounted by means of a pin 121 at the outside of the frame 105. A protrusion 108 is formed at the tip of the lock lever 107, so that the protrusion 108 may be of a configuration capable of guiding and confining the pin 117. The lock lever 107 is further formed of an engaging portion 115, so that the engaging portion 115 may be engaged with the other end of the spring 113. At the same time, the engaging portion 116 is fixed to the frame 105, so that the engaging portion 116 is engaged with the other end of the spring 113. Accordingly, in a normal or steady state, the spring 113 serves to constrain the lock lever 107 in a state shown in FIG. 5. The lock lever 107 has an operating portion 109 bent substantially at a right angle, so that the operating portion 109 extends over and inwardly of the frame 5. The operating portion 109 forcibly displaces the lock lever 107 to release its locked state.

In a normal or steady state, the spring 119 constrains the pin 117. Accordingly, the guide plate 29 is in pressure contact with the guide member 27, thereby to guide the label retaining backing sheet 21 and on exert a tension to the label retained backing sheet 21.

Figure 4:
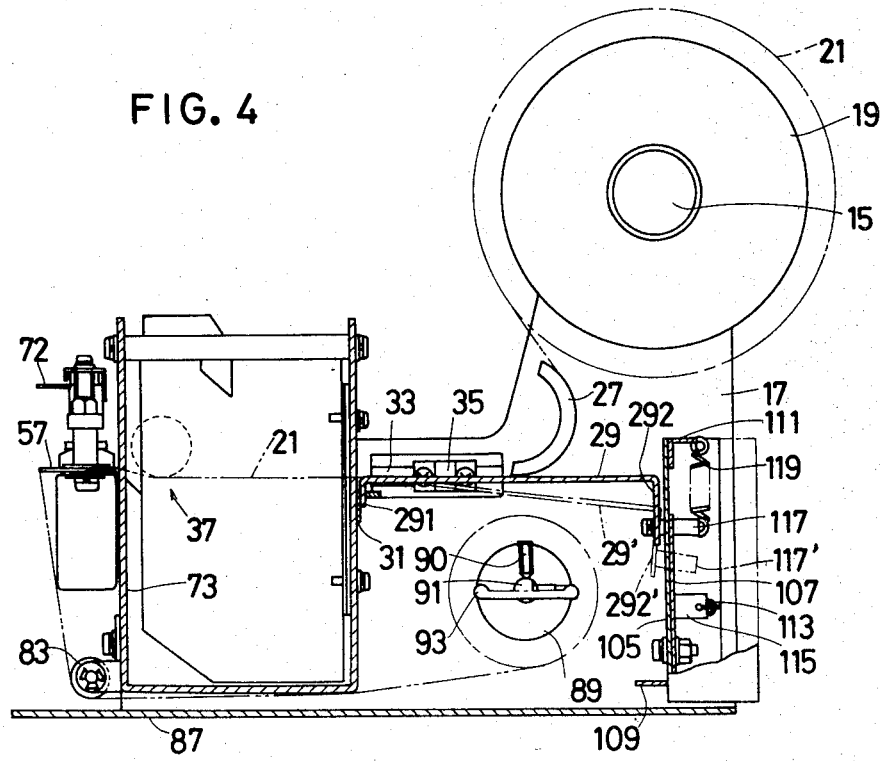
FIG. 4 is a view showing an arrangement in the rear of a printer of the embodiment of the present invention.

In loading a new rolled-up sheet 21 into the roll sheet supporting portion, the guide plate 29 is depressed downwardly from the upper position, as viewed in FIG. 4. Then, the guide plate 29 is displaced to the position 29' shown by a phantom line. Accordingly, the engaging pin 117 fixed to the other end portion 117' 292 of the guide plate 29 is displaced to the position Therefore, the pin 117 is displaced in the guide direction, as viewed in FIG. 5, along the elongated aperture 123 shown in FIG. 5. As the pin 117 is displaced, the lock lever 107 is depressed to the position 107' shown in FIG. 6 by means of the protrusion 108. If and when the pin 117 exceeds the position of the protrusion 108, the lock lever 107 is returned to the original position by the spring 113. Accordingly, the pin 117 is engaged with the protrusion 108 of the lock lever 107. Therefore, the guide plate 29 is locked in the state of the position 29' shown by the phantom line in FIG. 4. Accordingly, a gap is caused between the guide plate 29 and the guide member 27, so that the label retaining backing sheet 21 can be readily fed between the guide member 27 and the guide plate 29'. The label retaining backing sheet 21 thus fed between the guide member 27 and the guide plate 29' is further inserted into the printer frame 73 and through the printer 37 (FIG. 2) to reach the outside or the front of the printer frame 73. As described above, each of the labels 212 is substantially stripped from the backing sheet by means of the stripping plate 57 and is completely stripped manually by an operator, so that only the backing sheet 211 is guided by the guide roller 83 to the winding drum 89. Thus the backing sheet 211 is wound on the winding drum 89. Thus, loading of a new roll sheet 21 is completed.

Thereafter the operating portion 109 of the lock lever 107 is depressed downwardly, as viewed in FIG. 4. Then the lock lever 107 is again brought to the position 107' shown in FIG. 6. Therefore, an engaging relation of the protrusion 108 of the lock lever 107 with the pin 117 is released and the spring 119 draws again the pin 117 to the other end of the elongated aperture 123. Accordingly, the guide plate 29 is again automatically rotated from the position as shown as 29' in FIG. 4 to a normal state, so that the guide plate 29 is in pressure contact with the guide member 27.

More specifically, in a normal state the guide plate 29 is in pressure contact with the guide member 27, so that a predetermined tension is exerted on the label backing sheet 21, whereby the label backing sheet 21 is guided. By depressing the guide plate 29 as necessary, the guide plate 29 is retained in a depressed state by means of the lock lever 107, so that the replacement of a rolled-up sheet is very easy. After such replacement, a locking state by means of the lock lever 107 is released, so that a normal state is regained.

As seen in FIG. 5, the above described photodetector 35 is supported by a photodetector fixing member 34. The member 34 comprises a nut threaded to a lead screw 33, so that rotation of the lead screw 33 achieves adjustment of the position of the photodetector fixing member 34 and thus the position of the photodetector 35. The photodetector 35 detects the gap between the adjacent labels 212 shown in FIG. 13, for example, and the detected output signal is used to position the labels with respect to the printer 37 and the like. The lead screw 33 may be rotated by, for example, a knob 75 as seen in FIG. 3. Accordingly, rotation of the knob 75 achieves adjustment of the detecting position by the photodetector 35 and thus the printing position. A knob 77 shown in FIG. 3 is adapted to adjust the sensitivity of the photodetector 35 through manual operation thereof.

Now referring to FIGS. 3, 7A and 7B, the guide roller 83 and those associated therewith will be described. The guide roller 83 is provided under and forward of the printer 37, i.e. beneath the stamping portion 43. The guide roller 83 is rotatably supported by the shaft 81, which is supported by means of a roller bracket 79 fixed to the printer frame 73. The roller bracket 79 may be integrally formed as shown in FIG. 3 or may be separately provided as at 79a and 79b at both ends of the shaft 81 as shown in FIGS. 7A and 7B.

Figure 7A:
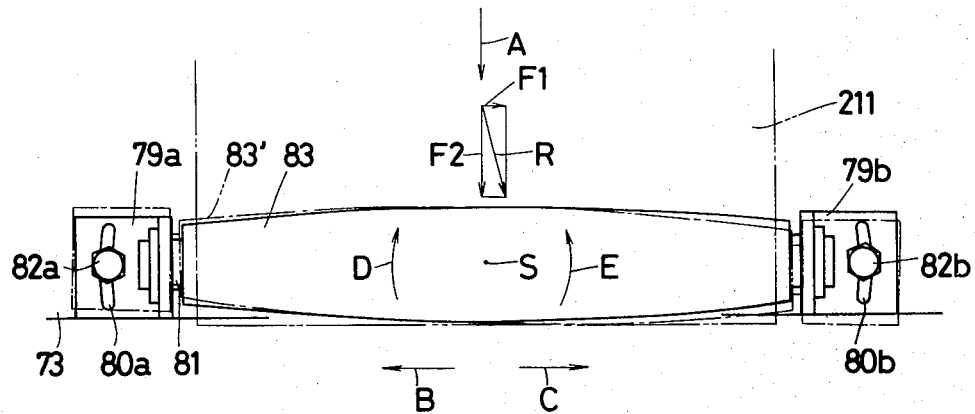
FIGS. 7A and 7B are views showing different embodiments of the guide roller of the present invention.
Figure 7B:
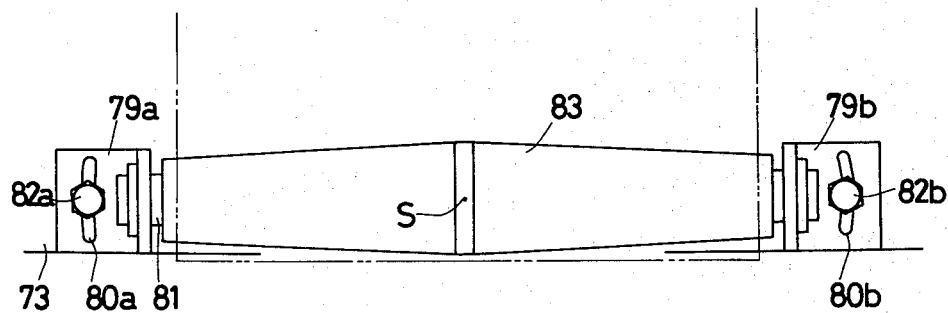

Referring to FIG. 7A, one end of the roller shaft 81 is supported by the bracket 79a and the other end of the roller shaft 81 is supported by the bracket 79b. The brackets 79a and 79b are provided with arcuate elongated apertures 80a and 80b, respectively. Screws 82a and 82b fix these bracket 79a and 79b to the printer frame 73 through the elongated apertures 80a and 80b, respectively.

If and when the axis of the shaft 25 (FIG. 3) supporting the roll sheet 21 and the axis of the rotation shaft 91 supporting the winding drum 89 and the arcuate guide member 28 and the stripping plate 57 are perfectly in parallel with each other, then the backing sheet 211 from which the labels have been stripped is fed straightforward in the direction of the arrow A as shown in FIG. 7A. However, if and when the above described parallel state of those portions is not met, the backing sheet 211 is obliquely transferred and deviates in the arrow B or C direction. For example, referring to FIG. 7A, if the backing sheet 211 is proceeding in the arrow R direction, force components shown as F1 and F2 are caused, with the result that the backing sheet 211 deviates in the arrow C direction. Therefore, in such a situation, the screw 82a and/or 82b are loosened, so that the two brackets 79a and 79b are slightly turned in the arrow B direction with the central point S of the guide roller 83 as a center, whereupon again the screws 82a and/or 82b are fastened. Thus, the guide roller 83 is slightly inclined as shown by a phantom line in FIG. 7A and is fixed. Then the backing sheet 211 is pushed backward in the arrow B direction by means of the inclined guide roller 83, with the result that the backing sheet 211 is brought to a properly guided state. Conversely, in case where the backing sheet 211 deviates in the arrow B direction, then the guide roller 83 may be slightly turned in the arrow E direction by means of the screws 82a and/or 82b. Such a slight adjustment of the roller shaft 81 and thus of the guide roller 83 can be made even in case of the FIG. 3 embodiment, by employing an arcuate shape aperture for insertion of the screws.

In the above described embodiment, the guide roller 83 has been selected to have a barrel shape, wherein the diameter at the central portion thereof is larger as compared with those at both ends. More specifically, assuming that the guide roller 83 would be a cylinder, then if and when the guide roller 83 is slightly inclined as described above, the end of the roller 83 is depressed to the side edge of the backing sheet 211, whereby the tension exerted to the backing sheet 211 becomes imbalanced in the left and right direction and the printing or stamping could not properly be achieved. Configuration of the barrel shaped guide roller 83 was employed to eliminate the above described inconveniences. FIG. 7A discloses a barrel shaped guide roller. However, alternatively, the roller 83 may be formed with a tapered surface, as shown in FIG. 7B, wherein the diameter of the roller 83 is decreased from the center toward both ends.

Now referring to FIGS. 4, 8, 9 and 10, the structure of the backing sheet winding portion will be described. The backing sheet winding portion comprises the winding drum 89 and the rotation shaft 91. The winding drum 89 is fixed to the rotation shaft 91 by means of the screw 90. The rotation shaft 91 is directly driven by a prime mover such as the reduction gear combined motor 125 (FIG. 5). As seen in FIG. 9, grooves 88 are formed on the peripheral surface of the winding drum 89 extending in the axial direction. The U-shaped member 93 (FIGS. 5 and 8) are inserted into the grooves 88. Then the motor 125 is energized and the winding drum 89 is accordingly rotated in the arrow G direction shown in FIG. 9, with the result that the backing sheet 211 is wound on the winding drum 89. After all of the backing sheet is wound on the winding drum 89, the U-shaped member 93 is removed from the grooves 88 of the winding drum 89 and then the backing sheet 211 as wound is removed from the winding drum 89.

Since in the embodiment shown the winding drum 89 is directly driven by the motor 125, it follows that the backing sheet 211 is tightly wound on the winding drum 89. Accordingly, after all of the backing sheet is wound on the winding drum, an attempt to remove the U-shaped member 93 from the grooves 88 of the drum 89 for releasing the tightly wound state of the backing sheet 211 could fail. In such a situation where the U-shaped member 93 cannot be removed with ease, it might be required to remove the backing sheet 211 from the winding drum 89 by rotating the backing sheet 211 in the arrow G direction, as shown in FIG. 9.

To avoid any of the above described difficulties, the embodiment shown is adapted such that the bottom surface 881 of the grooves 88 formed on the peripheral surface of the winding drum 89 is inclined in the axial direction, so that the bottom surface 881 slants from the base end of the winding drum 89 (the motor 125 side) toward the tip end. Accordingly, the U-shaped member 93 inserted in the grooves 88 is in contact with the bottom surface 881 of the grooves 88 only at the tip end portions 931 of the member 93.

Figure 10:
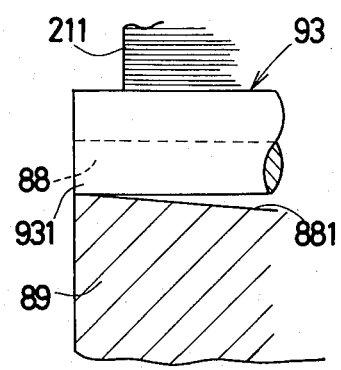
FIG. 10 is a diagrammatic view showing the relationship between the U-shaped member and the winding drum.

Thus, if the bottom surface 881 of the grooves 88 is inclined as shown in FIG. 10 in an enlarged manner so that only the tip end 931 of the member 93 contacts the bottom surface 881, the following advantages result. More specifically, after the backing sheet 211 has been wound on the winding drum 89 and the U-shaped member 93 is drawn in the direction of the arrow F as shown as at 93' by the phantom line in FIG. 8, the member 93 can be removed with ease from between the bottom surface 881 of the grooves 88 and the backing sheet 211. Due to the removal of the U-shaped member 93, a gap is caused between the winding drum 89 and the backing sheet 211. The size of the gap depends on the size of the protrusion of the U-shaped member 93 from the peripheral surface of the winding drum 89. The gap enables easy removal of the backing sheet 211 from the winding drum 89.

Figure 8:
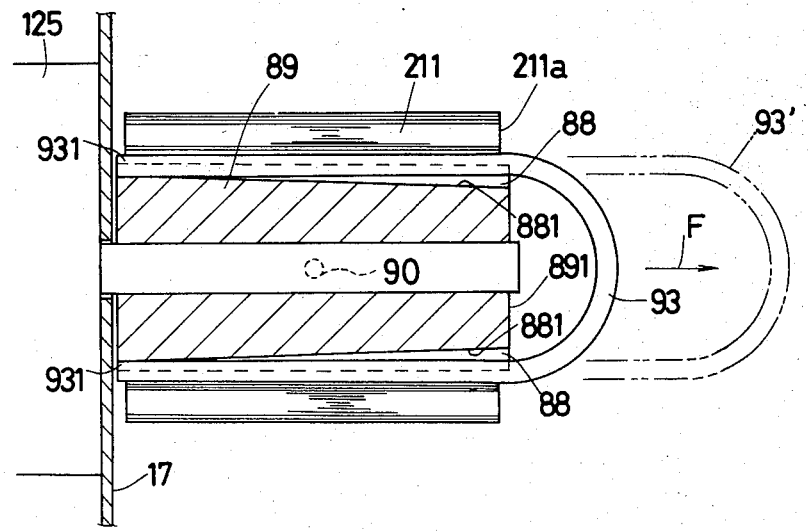
FIG. 8 is a sectional view showing a backing sheet winding portion.
Figure 9:
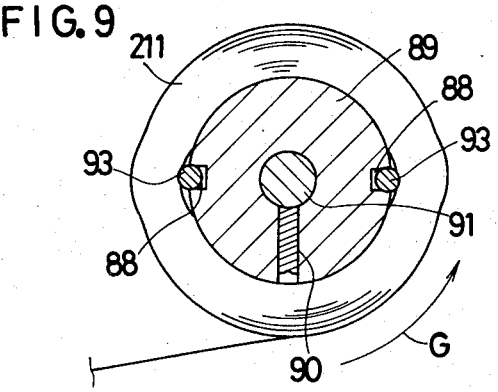
FIG. 9 is a sectional view, taken in the longitudinal direction of the backing sheet, of the backing sheet winding portion.
Figure 11A:
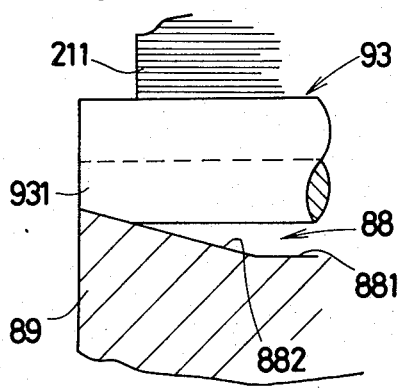
FIGS. 11A, 11B and 11C are views showing the relationships of the U-shaped member and the winding drum of different embodiments.
Figure 11B:
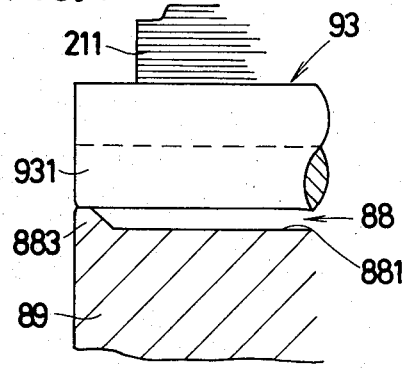
Figure 11C:
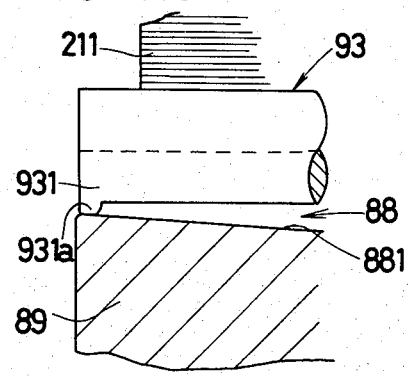

In the embodiments shown in FIGS. 8 and 10, the whole bottom surface of the grooves is shaped as an inclined surface. However, the present invention is not limited to such embodiments. For example, as shown in FIG. 11A, the bottom surface 881 of the grooves 88 may be shaped such that the slope is formed only in the vicinity of the base portion, so that the tip end 931 of the U-shaped member 93 may be in contact with only the end portion of the sloping surface 882. Alternatively, referring to FIG. 11B, a protrusion 883 may be formed at the base end portion of the bottom surface 881 of the grooves 88, so that only the tip portion 931 of the U-shaped member 93 may be in contact with the above described protrusion 883 of the bottom surface 881 of the grooves 88. Alternatively, referring to FIG. 11C, the bottom surface 881 of the grooves 88 may be formed as a tapered surface as shown in FIG. 10, while the tip 931 of the U-shaped member 93 may be formed of a projection 931a so as to abut against the bottom surface 881 of the grooves 88.

Figure 12:
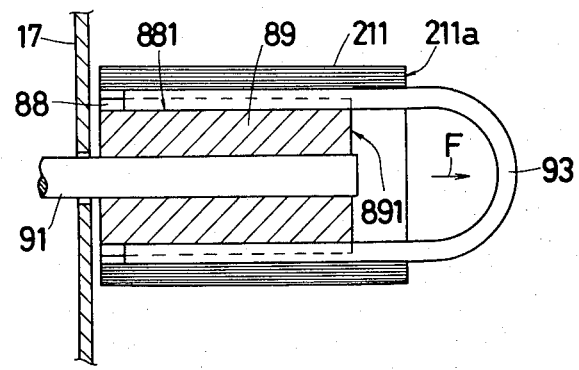
FIG. 12 is a sectional view showing another embodiment of the winding drum.

FIG. 12 shows another embodiment of the winding drum 89. More specifically, for removing the backing sheet 211 from the winding drum 89, the backing sheet 211 forming a coil is grasped at the outside end surface and is drawn in the axial direction of the drum 89. If the end surface 891 of the winding drum 89 is substantially coplanar or protrudes from the end surface 211a of the backing sheet 211 it is difficult to remove the sheet coil in one piece. However, if the end surface 891 of the winding drum 89 is retracted relative to the end surface 211a of the backing sheet 211, no problems arise in the winding of the backing sheet but the removal is facilitated. Therefore in the FIG. 12 embodiment, the winding drum 89 is slightly shorter than the width of the sheet 211 such that the end surface 891 of the winding drum 89 is retracted relative to the end surface 811a of the backing sheet 211 as wound whereby the end portion of the backing sheet coil 211 may be grasped by the hands for removal, without changing the shape of the coil 211.

Figure 14:
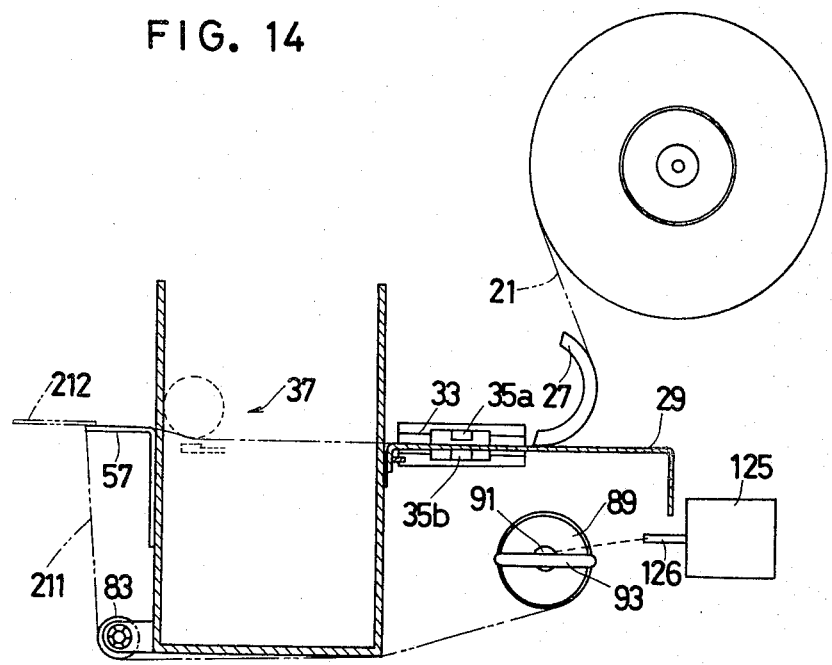
FIG. 14 is a diagrammatic view for illustrating a portion associated with a feeding operation of the label retaining backing sheet.

FIG. 14 shows the various components associated with a feeding path for feeding the label retaining backing sheet 21 and the backing sheet 211. More specifically, the label retaining backing sheet 21 is first guided from the coil supporting portion by means of the guide member 27 and the guide plate 29 past the position of the photodetector 35 to the printer 37. After the prescribed information is printed on the label by means of the printer 37, the labels 212 are substantially stripped by means of the stripping plate 57 and the label 212 as substantially stripped is completely stripped by an operator from the backing sheet 211. The backing sheet 211 is guided by the guide roller 83 to the winding drum 89. The winding drum 89 is coupled to the shaft 91. The shaft 91 is driven by the shaft 126 of the motor 125. The photodetector 35 comprises a light emitter 35a and a photosensor 35b, which are disposed to face each other to form a passage through which the label retained backing sheet 21 is fed. The detecting position of the photodetector 35, i.e. the light emitter 35a and the photosensor 35b, is adjustable as a function of the rotation of the lead screw 33, as described above.

Figure 15:
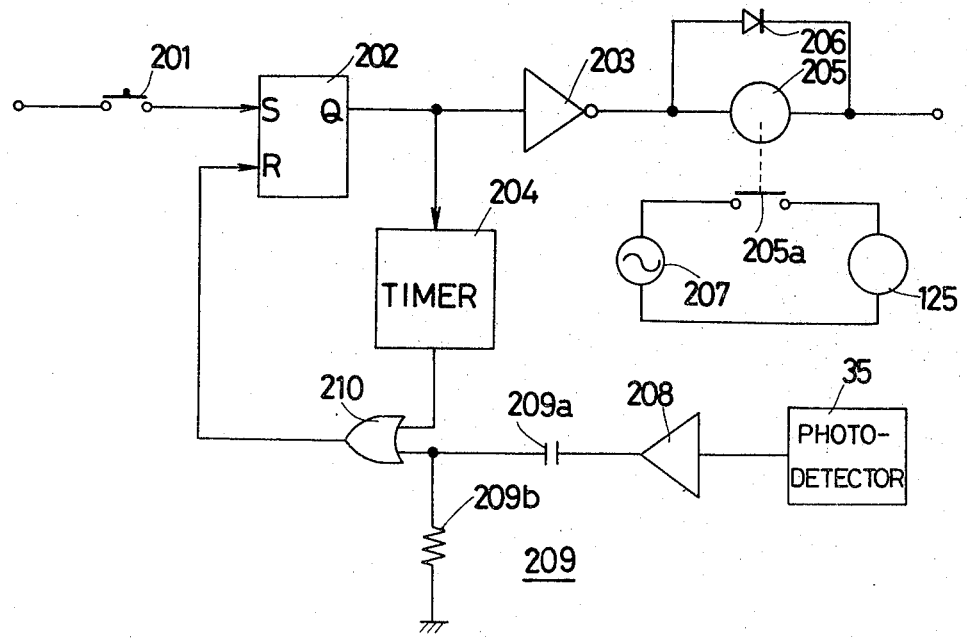
FIG. 15 is a block diagram showing one example of a drive control circuit of a motor for driving the winding drum.

FIG. 15 is a block diagram of a preferred embodiment of a driver circuit for intermittently feeding the label retaining backing sheet. Referring to FIG. 15, a feed start switch 201 will be closed by the operator for starting the feeding operation of the label retaining backing sheet. The switch 201 may comprise one key of the keyboard 11 shown in FIG. 1. One terminal of the feed start switch 201 is connected to a power supply source of sufficient voltage, while the other end of the switch 201 is connected to the set input S of the RS flip-flop 202. The non-inverted output Q of the flip-flop 202 is applied as a trigger input to the timer 204 and also to energize a relay solenoid 205 through a driver 203. The contact 205a of the relay solenoid 205 is operatively connected in the motor energizing circuit between the alternating current voltage source 207 and the motor 125. A rectifier 206 shunts the solenoid 205. The timer 204 is structured such that a timing operation is initiated when the output Q of the flip-flop 202 assumes the high level, to provide a high level output until after the lapse of a predetermined time period T. Accordingly, the timer 204 may comprise a monostable multivibrator. The output from the photosensor 35b (FIG. 14) of the photodetector 35 is applied to a differentiation circuit 209 through an amplifier 208. The differentiation circuit 209 comprises a capacitor 209a and a resistor 209b and functions to provide a pulse output if and when a shift occurs from the state in which only the backing sheet 211 (FIG. 13) was detected by the photodetector 35 to the state in which the label 212 is detected. The pulse output and the output of the previously described timer 204 are applied to the reset input R of the flip-flop 202 through an OR gate 210. More specifically, the flip-flop 202 is reset responsive to the output of the differentiation circuit 209 or the output of the timer 204, whichever comes first. The timing operation of the timer 204 is reset responsive to the resetting of the flip-flop 202 and the relay solenoid 205 is deenergized in response to the resetting of the flip-flop 202, whereby the contact 205a is opened.

Figure 16:
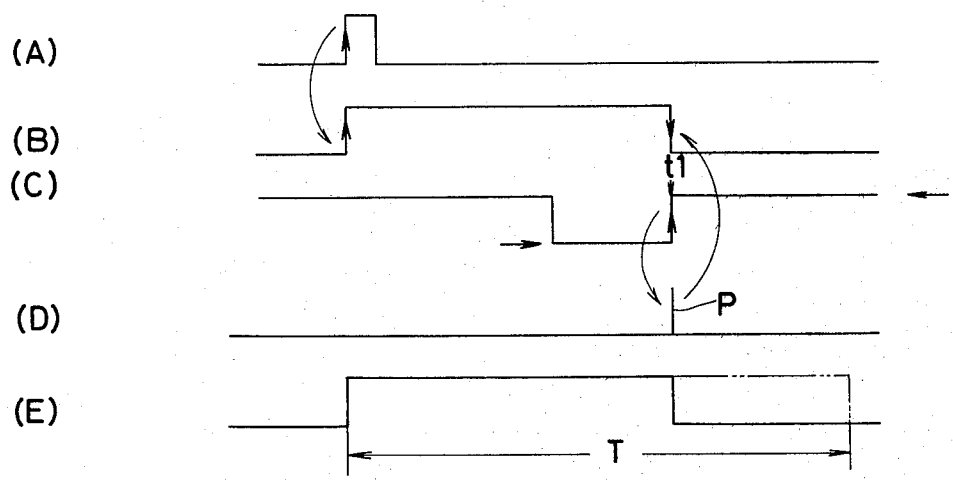
FIGS. 16 and 17 are timing charts for explaining the operation of the FIG. 15 embodiment.
Figure 17:
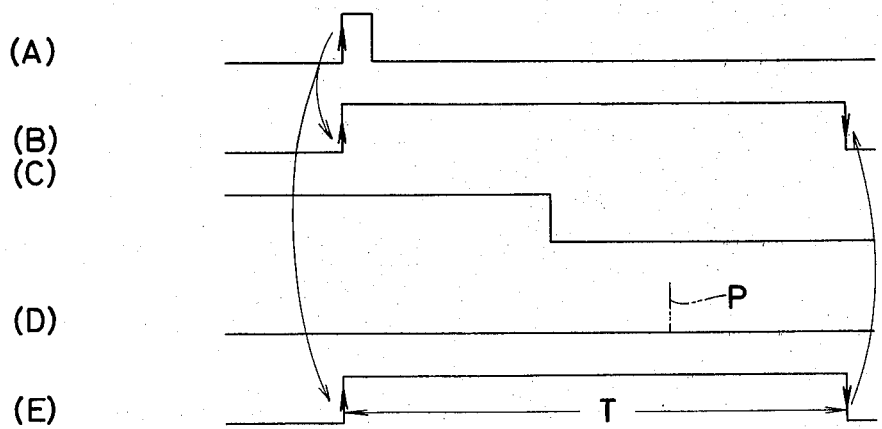

Now referring to FIGS. 16 and 17, an operation of the embodiment shown in FIGS. 14 and 15 will be described. First, for the purpose of issuing labels, the label feed start switch 201 is operated to close (FIG. 16A). Accordingly, the flip-flop 202 is set at that time and the output Q assumes the high level as shown in FIG. 16B. Accordingly, the relay solenoid 205 is energized in response to the output Q of the flip-flop 202 and the contact 205a is closed. Therefore, the driving motor 125 of the winding drum 89 starts to drive the drum 89. Accordingly, the label retaining backing sheet 21 is drawn from the coil supporting portion and fed along the feeding path shown in FIG. 14. As the sheet 21 is fed, the output of the photosensor 35b changes from "dark" or the high level to "light" or the low level, as shown in FIG. 16C, whereupon the output again becomes "dark" or the high level at the leading edge of the succeeding label. At the time t1 when the output of the photosensor 35b changes from "light" to "dark" the pulse output P as shown in FIG. 16D is provided at the output of the differentiation circuit 209. Accordingly, the flip-flop 202 is reset at that time t1. Therefore, as shown in FIG. 16E, the timer 204 is reset and the energization of the relay solenoid 205 is terminated. The contact 205a is opened at the time t1 when the flip-flop 202 is reset and a supply of power from the voltage source 207 to the motor 125 is terminated and the drum stops whereby a label is positioned at a prescribed position such as the printing position in the priner 37. The photodetector 35 is positioned so that a positional relation with respect to the printer 37 is accurately maintained and thus the label can be assuredly positioned at the printing position by the printer 37.

The timing chart shown in FIG. 16 shows that the pulse signal P is generated by the differentiation circuit 209 within a predetermined time period T of the timer 204, i.e. the following label is detected by the photodetector 35 within said predetermined time period T. However, assuming that the sheet 21 runs out or is broken for any reason, the output of the photosensor 35b of the photodetector 35 does not turn to "dark" or the high level after once the output turned from "dark" or the high level to "light" or the low level. Accordingly, without the timer 204, the pulse signal is not obtained from the differentiation circuit 209 and the flip-flop 202 is kept and the motor 125 is kept energized by the voltage source 207, which could cause overheating of the motor 125. To avoid this, the embodiment shown employs the timer 204, which is adapted such that the same is triggered in response to the rise of the output of Q of the flip-flop and the high level output (FIG. 17E) is withdrawn for a predetermined time period T. Accordingly, after the lapse of the predetermined time period T, the reset signal is applied from the timer 204 to the reset input of the flip-flop through the OR gate 210, whereby the flip-flop 202 is reset. After the lapse of the predetermined time period T, the relay solenoid 205 is deenergized and the contact 205a is opened and hence the motor 125 is stopped, irrespective of any change in the signal obtained from the photodetector 35. Thus, overheating of the motor is prevented.

Although in the above described embodiment the photodetector 35 was provided between the guide member 27 and the printer 37, alternatively the same may be located between the printer 37 and the stripping plate 57 or between the rolled-up sheet supporting portion and the guide member 27.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A computing scale with a label issuing system including a weighing portion for weighing the weight of a commodity and a label issuing portion for issuing a label to be stuck to said commodity based on weighed data obtained from said weighing portion; said label issuing portion comprising a base portion, printer means provided above said base portion and spaced apart from said base portion by a small gap, rolled-up sheet supporting means disposed above and in the rear of said printer means for supporting a coil of a label retaining backing sheet and so as to be capable of yielding said backing sheet, first guide means for guiding said backing sheet from said rolled-up sheet supporting means to a print position of said printer means for printing predetermined information on said label based on the weighed data obtained from said weighing portion, said computing scale further comprising: stripping means located forward of said printer means for substantially stripping a label from said backing sheet on which said predetermined information has been printed, strip operation enabling means associated with said stripping means for manually completely stripping said substantially stripped label, backing sheet winding means comprising rotation driving means, and a winding drum driven by said rotation driving means located below and in the rear of said printer means for winding said backing sheet from which labels have been stripped through said strip operation enabling means, second guiding means for guiding said backing sheet through said strip operation enabling means into said backing sheet winding means said rotation driving means further comprising power supply means, motor means connected to be energized by said power supply means, first switch means interposed between said power supply means and said motor means, and second switch means for starting a feeding operation of said backing sheet, whereby said first switch means serves to initiate a supply of power from said power supply means to said motor means in response to an operation of said second switch means.

2. The computing scale of claim 1, wherein said winding drum comprises at least one groove formed on the peripheral surface of said winding drum and extending in the axial direction of the drum, and an inserting member fitted into said at least one groove for protruding from said peripheral surface of said winding drum so that a gap is formed between said peripheral surface of said winding drum and said backing sheet by removing said inserting member for removing said wound backing sheet from said winding drum.

3. The computing scale of claim 1, wherein the axial length of said winding drum is shorter than the width of a coil of said backing sheet wound on said drum, whereby the end surface of the free end of said winding drum ends inwardly of an end surface of said backing sheet to leave a length of coil free for gripping.

4. The computing scale of claim 1, wherein said stripping means comprises a stripping plate for substantially stripping said label by feeding said backing sheet to be bent on the edge of said stripping plate while said backing sheet is drawn by said backing sheet winding means, whereby only said labels are peeled off, said stripping plate being used as a stamping table.

5. The computing scale of claim 1, further comprising label detecting means disposed at a defined position intermediate said rolled-up sheet supporting means and said stripping means, said first switch means being controlled to terminate a supply of power from said power supply means to said motor means in response to the detected output of said label detecting means.

6. The computing scale of claim 5, which further comprises timer means being triggered in response to operation of said second switch means for performing a timing operation of a predetermined time period, said first switch means being controlled to terminate a supply of power from said power supply means to said motor means in response to the output of said label detecting means or the output of said timer means, whichever comes first.

7. The computing scale of claim 6, which further comprises a flip-flop for controlling said first switch means, the set input of said flip-flop being connected to receive the output of said second switch means and the reset input of said flip-flop being connected to receive the output of said timer means or the output of said label detecting means.

8. The computing scale of claim 1, wherein said second guiding means comprises a guide roller for converting the direction of said backing sheet passing through said strip operation enabling means into the direction of said winding means, a roller shaft inserted into said guide roller, and a roller shaft supporting means for supporting said roller shaft to extend substantially in parallel to the surface of said backing sheet.

9. The computing scale of claim 8, wherein said roller shaft supporting means is arranged such that said roller shaft is slightly inclined for adjusting the parallel relation between said roller shaft and said surface of said backing sheet.

10. The computing scale of claim 9, wherein said guide roller is shaped in the peripheral surface thereof such that an approximate central portion of said roller shaft is larger in diameter than the end portions thereof.

11. The computing scale of claim 10, wherein said guide roller has a barrel shape.

12. The computing scale of claim 10, wherein said guide roller includes in the peripheral surface thereof a taper portion inclined to become smaller in diameter from said approximate central portion to said end portions.

13. The computing scale of claim 1, wherein said weighing portion and said label issuing portion are juxtaposed.

14. The computing scale of claim 13, wherein said weighing portion includes a weighing pan for placing said commodity, said computing scale further comprising casing means for covering all components other than said weighing pan of said weighing portion and said sheet supporting means of said label issuing portion.

15. The computing scale of claim 14, wherein said casing means is provided with digital displaying means for displaying in a digital manner predetermined information based on weighed data from said weighing portion.

16. The computing scale of claim 15, wherein said displaying means comprises two display sets one of which is arranged on the side facing an operator and the other set being arranged facing a customer.

17. The computing scale of claim 16, which further comprises an operating portion including key input means provided at the side facing an operator in said casing means.

18. The computing scale of claim 1, wherein said first guiding means includes a guide member for converting the direction of said label retaining backing sheet drawn from said rolled-up sheet supporting means into the direction of said printer means, and a tension plate for applying a predetermined tension to said backing sheet passing through there between in cooperation with said guide member.

19. The computing scale of claim 18, wherein said tension plate is supported at one end thereof so that the other end thereof is turnable, and wherein first spring means is provided at said other end for urging said tension plate toward said guide member.

20. The computing scale of claim 19, which further comprises locking means for holding said other end of said tension plate against the elastically effective force of said first spring means with said other end being separated from said guide member.

21. The computing scale of claim 20, wherein said other end of said tension plate is provided with an engaging pin for engaging said one end of said first spring means, and wherein said locking means includes a lock lever having an engaging portion for engaging said engaging pin in the state wherein said tension plate is depressed in a direction separating said tension plate from said guide member.

22. The computing scale of claim 21, which further comprises a second spring means for biasing said lock lever in such a direction that an engaging portion thereof is engaged with said engaging pin, said lock lever being further structured so that said engaging portion automatically engages said engaging pin by the action of said second spring means when said lock lever is depressed in said direction.

23. The computing scale of claim 22, wherein said lock lever comprises an operating portion, and wherein said locking state is automatically released by the action of said first spring means when the engagement with said engaging pin of said engaging portion is released through an operation of said operating portion.

24. The computing scale of claim 1, which further comprises stamping means located between said printer means and said stripping means for stamping an information item of said commodity on the label on which predetermined informations have been printed by said printer means.

25. The computing scale of claim 24, wherein said stamping means comprises a stamping table positioned below a label on said backing sheet, a stamping plate located above said stamping table for stamping the items on said label on said stamping table, and driving means for causing a stamping operation on said label on said stamping table by said stamping plate.

26. The computing scale of claim 25, wherein said driving means comprises a solenoid and a plunger driven by said solenoid, and wherein said stamping plate is stamped on the label on said stamping table by said plunger.

27. The computing scale of claim 26, wherein said solenoid is located below said stamping table and said plunger extends upwardly from said stamping table through said stamping table, and wherein said computing scale further comprises a bar mounted in the upper portion of said plunger and a stamping plate mounting means located on the side at one end of said bar for mounting said stamping plate at the position corresponding to that of said stamping table.

28. The computing scale of claim 27, which further comprises weight applying means located on the other side at the end of said bar for balancing the weight of said stamping plate with respect to the position of said plunger acting as a fulcrum.

29. The computing scale of claim 28, wherein said weight applying means comprises a rod operatively arranged at the other end of said bar and depending from said bar.

30. The computing scale of claim 29, wherein said weight applying means further comprises a weight mounted on said rod.

31. The computing scale of claim 1, wherein said backing sheet winding drum comprises two grooves extending axially in the peripheral surface of the drum, and an inserting member having two inserting legs for insertion into said two grooves respectively.

32. The computing scale of claim 31, wherein said bottom surfaces of said two grooves are formed with protrusions at given positions so as to be in contact with said inserting legs of said inserting member at said given positions.

33. The computing scale of claim 31, wherein said two inserting legs comprise protrusions located to contact with the bottom surfaces in said grooves.

34. The computing scale of claim 31, wherein said inserting membeer has a U-shape and the two U-legs are inserted into said two grooves.

35. The computing scale of claim 31 or 34, wherein said two inserting legs of said inserting member are structured so as to be in contact with the bottom surfaces of said grooves only at given positions in the axial direction of said winding drum.

36. The computing scale of claim 35, wherein said given positions in the axial direction are located at the furthermost end portion of said winding drum in the axial inserting direction.

37. The computing scale of claim 36, wherein the bottom surfaces of said two grooves are tapered so as to be in contact with said inserting legs of said inserting member only at said positions.

38. A computing scale with a label issuing system including a weighing portion for weighing the weight of a commodity and a label issuing portion for issuing a label to be stuck to said commodity based on weighed data obtained from said weighing portion; said label issuing portion comprising a base portion, printer means provided above said base portion and spaced apart from said base portion by a small gap, rolled-up sheet supporting means disposed above and in the rear of said printer means for supporting a coil of a label retaining backing sheet and so as to be capable of yielding said backing sheet, first guide means for guiding said backing sheet from said rolled-up sheet supporting means to a print position of said printer means for printing predetermined information on said label based on the weighed data obtained from said weighing portion, said computing scale further comprising: stripping means located forward of said printer means for substantially stripping a label from said backing sheet on which said predetermined information has been printed, strip operation enabling means associated with said stripping means for manually completely stripping said substantially stripped label, backing sheet winding means located below and in the rear of said printer means for winding said backing sheet from which labels have been stripped through said strip operation enabling means, second guiding means for guiding said backing sheet through said strip operation enabling means into said backing sheet winding means, stamping means located between said printer means and said stripping means for stamping an information item of said commodity on the label on which predetermined informations have been printed by said printer means, said stamping means comprising a stamping table positioned below a label on said backing sheet, a stamping plate located above said stamping table for stamping the items on said label on said stamping table, and driving means for causing a stamping operation on said label on said stamping table by said stamping plate, said driving means for causing a stamping operation comprising a solenoid and a plunger driven by said solenoid for said stamping plate on the label on said stamping table, wherein said solenoid is located below said stamping table and said plunger extends upwardly from said stamping table through said stamping table, and wherein said computing scale further comprises a bar mounted in the upper portion of said plunger and a stamping plate mounted means located on the side at one end of said bar for mounting said stamping plate at the position corresponding to that of said stamping table.

39. A computing scale with a label issuing system including a weighing portion for weighing the weight of a commodity and a label issuing portion for issuing a label to be stuck to said commodity based on weighed data obtained from said weighing portion; said label issuing portion comprising a base portion, printer means provided above said base portion and spaced apart from said base portion by a small gap, rolled-up sheet supporting means disposed above and in the rear of said printer means for supporting a coil of a label retaining backing sheet and so as to be capable of yielding said backing sheet, first guide means for guiding said backing sheet from said rolled-up sheet supporting means to a print position of said printer means for printing predetermined information on said label base on the weighed data obtained from said weighing portion, said computing scale further comprising: stripping means located forward of said printer means for substantially stripping a label from said backing sheet on which said predetermined information has been printed, strip operation enabling means associated with said stripping means for manually completely stripping said substantially stripped label, backing sheet winding means located below and in the rear of said printer means for winding said backing sheet from which labels have been stripped through said strip operation enabling means, second guiding means for guiding said backing sheet through said strip operation enabling means into said backing sheet winding means, wherein said first guide means includes a guide member for converting the direction of said label retaining backing sheet drawn from said rolled-up sheet supporting means into the direction of said printer means, and a tension plate for applying a predetermined tension to said backing sheet passing through there between in cooperation with said guide member, wherein said tension plate is supported at one end thereof so that the other end thereof is turnable, and wherein first spring means is provided at said other end for urging said tension plate toward said guide member.

* * * * *

UNITED STATES PATENT OFFICE
CERTIFICATE OF CORRECTION

Patent No. 4,301,878    Dated November 24, 1981

Inventor(s) Masao Soe

It is certified that error appears in the above-identified patent and that said Letters Patent are hereby corrected as shown below:

In [57] ABSTRACT, line 8, replace "backing sheet rolled-up" by --rolled-up backing sheet--.

Claim 34, line 2, replace "membeer" by --member--.

Claim 38, fourth line from the bottom, replace "mounted" by --mounting--.

Signed and Sealed this

Ninth Day of March 1982

[SEAL]

Attest:

Attesting Officer

GERALD J. MOSSINGHOFF

Commissioner of Patents and Trademarks